L. E. SALMON.
BORING TOOL HOLDER.
APPLICATION FILED MAY 27, 1915.
1,187,393.
Patented June 13, 1916.
2 SHEETS—SHEET 2.
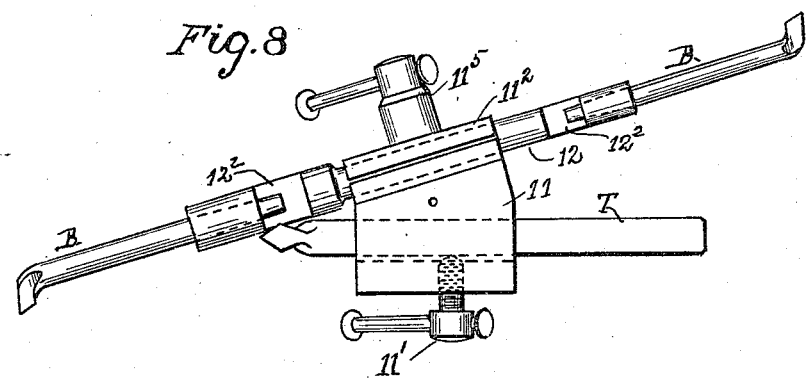
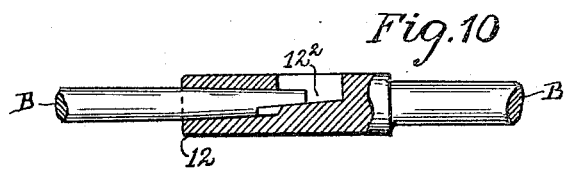
Witnesses
W. W. Bardsley.
Arthur A. Rhodes.
Inventor
Louis E. Salmon
By Henry Marsh Jr.
Atty.

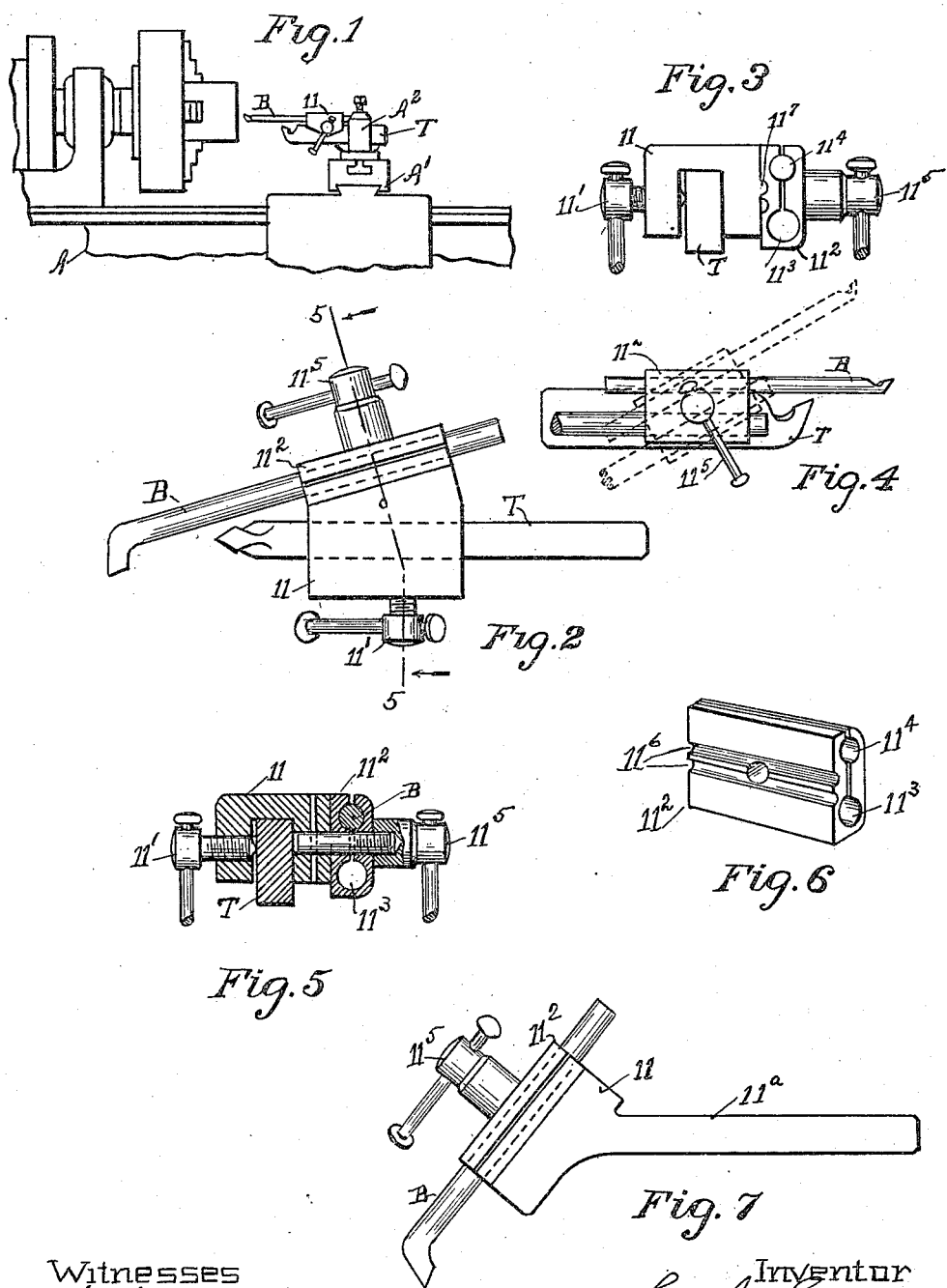
L. E. SALMON.
BORING TOOL HOLDER.
APPLICATION FILED MAY 27, 1915.
1,187,393.
Patented June 13, 1916.
2 SHEETS—SHEET 1.

UNITED STATES PATENT OFFICE.

LOUIS E. SALMON, OF AUBURN, RHODE ISLAND.

BORING-TOOL HOLDER.

1,187,393.  Specification of Letters Patent.  Patented June 13, 1916.

Application filed May 27, 1915. Serial No. 31,075.

*To all whom it may concern:*

Be it known that I, LOUIS E. SALMON, a citizen of the United States, residing at Auburn, in the county of Providence and State of Rhode Island, have invented a new and useful Boring-Tool Holder, of which the following is a specification.

In the machinist's art it has been the common practice, in cases when a boring operation is to follow the work of a lathe tool, to remove the lathe tool from the tool-post and substitute the boring tool, thus necessitating the setting of the boring-tool and the resetting of the lathe-tool; likewise in cases where it is necessary to change the boring-tool for another of different size or length time is lost in changing the tools and in the setting of the second one. In both instances there is the added difficulty of securing the same "set" of the first and second boring-tool, or of re-setting the lathe tool exactly as before it was removed from the tool post.

The purposes of my invention are to provide a boring-tool holder which can be readily operatively secured upon a lathe tool without changing or disturbing the set of the latter, and which will carry a plurality of boring-tools of different sizes and lengths, with provision for reversing the holder to bring into identical operative alinement or "set" one boring-tool after another, thereby eliminating the loss of time incident to setting and re-setting the different tools, and insuring more accurate work. These purposes I accomplish by the new and useful construction, combination and arrangement of parts hereinafter described, and illustrated in the accompanying drawings, in which,—

Figure 1 is a side elevation showing the application of my invention, the lathe bed and slide rest being partly broken away. Fig. 2 is a plan view of my boring tool holder, the lathe tool, and the boring tool carried by my holder. Fig. 3 is an end view of my invention, and the lathe tool. Fig. 4 is a diagrammatic view illustrating the mode of reversing my holder and the boring tools. Fig. 5 is a transverse section on line 5—5 of Fig. 2. Fig. 6 is a perspective view of the reversible member of my boring tool holder, fitted to carry two boring tools of different diameters. Fig. 7 is a plan view of a modified form of my boring tool holder adapted for use in place of the ordinary lathe tool as a support for the boring tools. Fig. 8 is a plan view of my boring tool holder as adapted to carry operatively a plurality of boring tools of different diameters and lengths. Fig. 9 is a side elevation of the auxiliary part of my holder adapted to extend the operative length of the boring tools. Fig. 10 is a view partly in section showing the mode of holding the boring tools in said auxiliary part.

Similar reference letters and numerals indicate like parts in the several views of the drawings.

Referring to the drawings: A represents the lathe bed, $A^1$ the slide rest, and $A^2$ the tool post of the well known form of lathe.

The lathe tool of the ordinary form held in the tool post in the well known manner is represented by T.

My boring tool holder is composed of a stationary member 11 slotted on its under side to fit over the lathe tool T and provided with means as the turn screw $11^1$ for clamping it upon said tool, (Figs. 2, 3 and 5), and a second reversible member $11^2$ provided with one or more longitudinal perforations, as $11^3$, $11^4$, arranged and adapted to receive the shank of a boring tool, as B, said perforations being of different diameters to accommodate boring tools of different sizes. Said member $11^2$ is further provided with a centrally disposed open slot at one side opening into both perforations, thereby giving sufficient spring to the said member to enable it to be clamped firmly upon the boring tool or tools, inserted in said perforations, by means of the turn screw $11^5$. (Figs. 3 and 5.) Said second member $11^2$ is further provided with a plurality of centrally disposed longitudinal grooves, as $11^6$, arranged and adapted to engage in turn corresponding ribs $11^7$ on the member 11 and thereby serve to retain the member $11^2$ in right alinement for proper operation of the boring tool carried by it. By means of the described construction of the second member I am enabled to secure a boring tool of one size extending from one end of said member $11^2$, and another boring tool of a larger or smaller size extending from the opposite end of said member, and to reverse said member $11^2$ and thereby bring said boring tools in turn into correct operative alinement without changing or disturbing the set or adjustment of either, thus insuring positive accuracy of each successive operation of the tools. In the diagrammatic view, Fig. 4, the member 11², carrying two boring tools of different sizes, is shown, by the dotted lines, partially reversed.

In Fig. 7 I have shown a modified form of the member 11, in which said member, instead of being slotted on its under side, is provided with an integral shank adapted to be inserted in the tool post of lathe in cases where the ordinary lathe tool is not used. In this case the member 11² is reversible as in the other case.

In many instances it is necessary to bore to a greater depth than the ordinary boring tool will reach, and in order to obviate the multiplication of boring tools I provide, as means for extending the operative range of the ordinary boring tool, the fixture 12 fitted to be firmly held in the member 11², as shown in Fig. 3, and provided at each extremity with an enlargement 12¹ taperingly bored axially to serve as a seat for corresponding tapered boring tools, said tapered bore terminating in a shoulder adapted to be engaged by a corresponding shoulder on the tail of the boring tool. Each of said enlargements of the fixture 12 is provided with an open slot 12² to afford easy access to the tail of the boring tool to release the tool. (Figs. 8, 9 and 10). The described construction of the fixture 12 insures proper stability and rigidity of the boring tools inserted therein. The opposite extremities of the fixture 12 are bored and tapered to receive boring tools of different diametered shanks, as shown. The member 11² is shown in the drawings as perforated for two boring tools, but it may be provided with more so as to carry more than the two shown.

In the practical operation of my invention the lathe tool having completed its work the member 11 is clamped upon it without disturbing the lathe tool, the boring tool performs its work, and in cases where necessary the member 11² is reversed to bring the opposite boring tool into operative position, and when the boring is completed the member 11 is released from the lathe tool which without further adjustment is ready to perform its required work. In cases where my holder is to be used independently of the lathe tool the shank 11ª is secured in the tool post A², and the boring tools operated and reversed as in the other instance.

I claim as my invention, and desire to secure by Letters Patent:

1. A holder for boring tools comprising a body composed of two separable members, one of said members arranged and adapted for engagement with a lathe tool held in the tool post of a lathe or similar machine, and the other member carried by and pivotally reversible longitudinally of said first member and arranged and adapted to operatively hold oppositely directed tools, means for securing said boring tools in said second member and also for securing said two members together in operative position, and other means for securing said first member upon the lathe tool without disturbing the "set" of the latter.

2. In a holder for boring tools, the combination with a member operatively connected with the tool post of a lathe or similar machine, of a second member carried by and pivotally reversible longitudinally of said first member and provided with longitudinal perforations adapted to hold oppositely disposed boring tools, means for securing said boring tools operatively in said perforations, and other means for operatively connecting the whole with the tool post of the machine.

3. The combination with a boring tool holder comprising a member operatively connected with the tool post of a machine, and a clamping member reversibly mounted upon said first member, of a third member carried by said clamping member and provided with holding means for oppositely directed boring tools, arranged and adapted, as shown and described, to extend at will the longitudinal range of operation of the boring tools.

4. The combination with a lathe tool held in the tool post of a lathe or similar machine, of a boring tool holder composed of two separable members, one of said members arranged and adapted to be secured upon and removed from said lathe tool without disturbing the adjustment of the latter, and the other member reversibly superimposed upon said first member and arranged and adapted to operatively hold one or more boring tools.

5. In a holder for boring tools the combination with a member arranged and adapted for operative engagement with the tool post of a lathe or similar machine, and provided on its face with one or more longitudinally disposed ribs, of a second member fitted to operatively hold a plurality of oppositely disposed boring tools, and, carried by said first member and reversible longitudinally thereof, provided with one or more longitudinally disposed grooves in its inner face adapted to engage the corresponding ribs on said first member to thereby retain in right operative alinement said second member and the tools held therein, and means for securing said two members in operative position.

LOUIS E. SALMON.

Witnesses:
HENRY MARSH, Jr.
GEORGE E. THURBER.

Copies of this patent may be obtained for five cents each, by addressing the "Commissioner of Patents, Washington, D. C."